United States Patent
Oh et al.

(10) Patent No.: US 11,459,989 B2
(45) Date of Patent: Oct. 4, 2022

(54) CLIP FOR INJECTOR

(71) Applicant: HYUNDAI KEFICO CORPORATION, Gyeonggi-do (KR)

(72) Inventors: Seung Hyuk Oh, Gyeonggi-do (KR); Young Il Kang, Gyeonggi-do (KR); Kwang Won Koo, Seoul (KR); Yeon Jee Oh, Seoul (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 85 days.

(21) Appl. No.: 16/014,767

(22) Filed: Jun. 21, 2018

(65) Prior Publication Data

US 2018/0372045 A1    Dec. 27, 2018

(30) Foreign Application Priority Data

Jun. 23, 2017   (KR) .................. 10-2017-0079643

(51) Int. Cl.
*F02M 61/14* (2006.01)
*F02M 61/16* (2006.01)
*F16B 2/22* (2006.01)

(52) U.S. Cl.
CPC .......... *F02M 61/14* (2013.01); *F02M 61/168* (2013.01); *F16B 2/22* (2013.01); *F02M 2200/851* (2013.01); *F02M 2200/853* (2013.01)

(58) Field of Classification Search
CPC ............... F02M 61/14; F02M 61/168; F02M 2200/851; F02M 2200/853; F16B 2/22
USPC ..................................................... 123/470
See application file for complete search history.

(56) References Cited

U.S. PATENT DOCUMENTS

| | | | | |
|---|---|---|---|---|
| 5,803,052 A * | 9/1998 | Lorraine | ............... | F02M 69/465 |
| | | | | 123/456 |
| 5,970,953 A * | 10/1999 | Lorraine | ................ | F02M 61/14 |
| | | | | 123/456 |
| 6,481,420 B1 * | 11/2002 | Panasuk | ............... | F02M 61/168 |
| | | | | 123/470 |
| 6,830,037 B1 * | 12/2004 | Braun | ................ | F02M 63/0225 |
| | | | | 123/470 |
| 7,373,926 B2 * | 5/2008 | Eckbauer | ............... | F02M 55/00 |
| | | | | 123/470 |
| 7,802,559 B2 * | 9/2010 | Furst | ...................... | F02M 61/14 |
| | | | | 123/470 |
| 7,856,962 B2 * | 12/2010 | Harvey | .................. | F02M 61/14 |
| | | | | 123/470 |
| 9,032,934 B2 * | 5/2015 | Nakamura | ............. | F02M 69/04 |
| | | | | 123/456 |

(Continued)

FOREIGN PATENT DOCUMENTS

CN    101806267 A    8/2010
EP      1892408 A1    2/2008
(Continued)

*Primary Examiner* — Hung Q Nguyen
*Assistant Examiner* — John D Bailey
(74) *Attorney, Agent, or Firm* — Fox Rothschild LLP

(57) ABSTRACT

The present disclosure relates to a clip for an injector, in particular, the clip for the injector including a base portion and an elastic piece of the clip that elastically support the upper surface of a connector housing and the lower surface of an injector cup, thus attenuating fuel injection load. In addition, an engaging piece of the clip is inserted into an engaging portion of the injector cup, thus preventing the rotation of the injector.

7 Claims, 9 Drawing Sheets

(56) References Cited

U.S. PATENT DOCUMENTS

| | | | |
|---|---|---|---|
| 9,212,641 B2* | 12/2015 | Nakamura | F02M 55/02 |
| 9,435,303 B2* | 9/2016 | Yasuda | F02M 61/14 |
| 9,506,438 B2* | 11/2016 | Inomata | F02M 55/025 |
| 9,938,948 B2* | 4/2018 | Serra | F02M 61/14 |
| 10,047,712 B2* | 8/2018 | Di Domizio | F02M 61/14 |
| 10,094,351 B2* | 10/2018 | Oh | F02M 61/14 |
| 2002/0100456 A1* | 8/2002 | Panasuk | F02M 55/004 123/456 |
| 2003/0183200 A1* | 10/2003 | Bugos | F02M 61/14 123/456 |
| 2006/0137659 A1* | 6/2006 | Zdroik | F02M 55/005 123/470 |
| 2010/0154746 A1* | 6/2010 | Fischer | F02M 61/14 123/456 |
| 2010/0218742 A1* | 9/2010 | Fischer | F02M 55/02 123/456 |
| 2010/0218743 A1* | 9/2010 | Marc | F02M 61/14 123/470 |
| 2011/0030656 A1* | 2/2011 | Pepperine | F02M 61/14 123/470 |
| 2012/0247426 A1* | 10/2012 | Roseborsky | F02M 61/14 123/470 |
| 2013/0074951 A1* | 3/2013 | Marc | F02M 61/14 137/343 |
| 2013/0192565 A1* | 8/2013 | Roseborsky | F02M 61/14 123/470 |
| 2015/0128908 A1* | 5/2015 | Matteini | F02M 55/004 123/470 |
| 2017/0342952 A1* | 11/2017 | Pasquali | F02M 55/005 |
| 2017/0356413 A1* | 12/2017 | Oh | F02M 61/14 |
| 2018/0223781 A1* | 8/2018 | Suzuki | F02M 61/14 |
| 2018/0266375 A1* | 9/2018 | Suzuki | F02M 61/14 |

FOREIGN PATENT DOCUMENTS

| | | |
|---|---|---|
| JP | 2013-050109 A | 3/2013 |
| KR | 20100094427 A | 8/2010 |
| KR | 10-1739694 B1 | 5/2017 |

\* cited by examiner

CLIP FOR INJECTOR

CROSS-REFERENCE TO RELATED APPLICATIONS

This application claims priority to Korean Patent Application No. 10-2017-0079643, filed on Jun. 23, 2017, the disclosure of which is incorporated herein by reference in its entirety.

TECHNICAL FIELD

The present disclosure relates to a clip for an injector, and more particularly, to a clip for an injector capable of attenuating the load that is applied on the injector upon fuel injection and preventing the rotation of the injector.

RELATED ART

An automobile injects fuel into a combustion chamber of an engine and combusts it to obtain the power required for driving. An injector, which is the device that injects the fuel pumped from a fuel tank to the inside of the combustion chamber, refers to a fuel injection valve.

The injector is connected with a fuel rail by inserting an upper body thereof on which a fuel inlet is formed into an injector cup of the fuel rail. The body of the injector is inserted into an injector hole provided in a cylinder head, and installed as the structure in which a nozzle portion of the lower end thereof is protruded toward the combustion chamber. Accordingly, the fuel of the fuel rail can be injected to the combustion chamber through the nozzle of the lower end thereof via the inside of the injector.

Meanwhile, the injector receives a continuous and repetitive force in the direction opposite to the injection direction of the fuel, and the vibration of the engine or the vibration due to the vehicle operation is also delivered to the injector, such that there is the phenomenon that the installation state of the injector becomes unstable. That is, the movement in the vertical direction and/or the rotation direction occurs on the injector.

Thus, when the injector operates in the unstable installation state, the fuel is not injected to the accurate angle and location to adversely affect the combustion performance, thereby the undesired movement of the injector is typically prevented by installing a clip (also referred to as 'retainer') on the injector.

An embodiment of the clip for the injector in accordance with the conventional technology is disclosed in Korean Patent No. 10-0692730 (hereinafter, referred to as 'the related art'). The clip for the injector (the injector fixing device) of the related art is provided in a structure that is formed in approximately an U shape, a fixing portion inserted into a fixing groove of the injector is formed to be protruded on the inside surface of both side leg portions, a slit into which a stopper portion formed to be protruded on an injector engaging portion (an injector cup) of a delivery pipe (a fuel rail) is formed on the both side leg portions, and a pressurized member for elastically supporting one side portion of the injector engaging portion is formed on the base portion between the leg portions.

Accordingly, when mounting the clip on the engaging portion of the injector and the delivery pipe, the fixing portion of the clip is inserted into the fixing groove of the injector, the stopper portion of the injector engaging portion is inserted into the slit of the clip, and the pressurized member of the clip elastically supports one side portion of the injector engaging portion to fix the injector to the injector engaging portion of the delivery pipe.

As described above, the clip for the injector is installed between the injector engaging portion and the injector to fix the injector, thus helps maintaining the fixed state of the injector against the load due to the fuel injection (fuel injection reaction force), and the engine vibration or the vibration due to the vehicle operation.

The above-described clip for the injector maintains the stability of the installation state of the injector, and much efforts has been made to develop a new clip that has more advanced functions and effects (e.g., structural integrity, manufacturability, assemblability, etc.) while sufficiently attenuating the fuel injection reaction force.

The above information disclosed in this section is merely for enhancement of understanding of the background of the disclosure and therefore it may contain information that does not form the prior art that is already known to a person of ordinary skill in the art.

SUMMARY

An object of the present disclosure is to provide a clip for an injector capable of effectively attenuating the fuel injection load, having enhanced durability that can withstand fatigue failure, preventing the rotation of the injector, and preventing the injector from separating from the fuel rail upon assembly.

The present disclosure for achieving the object may include a base portion configured to tightly abut an upper surface of a connector housing of an injector to elastically support the upper surface of the connector housing of the injector; a pair of first elastic portions elongated from both side portions of the rear end of the base portion and bending downward; a pair of second elastic portions formed at both of the first elastic portions and bending smoothly upward; and a pair of elastic pieces elongated from both of the second elastic portions and inclined upward toward a front direction, which is configured to tightly abut a lower surface of an injector cup of a fuel rail to elastically support the lower surface of the injector cup of the fuel rail.

In the present disclosure of the clip for the injector, the base portion may include an injector receiving portion into which an upper body of the injector may be inserted. The both side inner circumferential surfaces of an inlet of the injector receiving portion may include a protrusion portion for preventing a separation of the upper body of the injector. The center of the inner circumferential surface of the injector receiving portion may include a separation groove.

An upper surface of the base portion may be configured to support a stopper protrusion formed on an outer circumference of the upper body of the injector. Additionally, a tightly contacting portion, which is formed to be protruded closer toward the connector housing of the injector than the first elastic portions to be tightly contacted to both side surfaces of the connector housing, may be interposed between the rear end of the base portion and the upper end of the first elastic portions. The end portion of the elastic piece may be smoothly bent downward to form an inclined portion.

The clip for the injector may further include an engaging piece, which is formed to be protruded upward from the rear end of the base portion and configured to be inserted into an engaging hole of an engaging portion formed on the injector cup of the fuel rail. The front surface of the engaging piece may be inserted into a seating groove formed on the rear surface of the injector cup to be coupled in the rotational direction thereof.

In addition, the base portion may be formed in the straight-line shape that the width of both outside surfaces becomes narrower toward the front direction. A pair of rotation prevention pieces may be formed to be protruded on both front end portions of the base portion, respectively, and configured to receive a stopper portion between the pair of the rotation prevention pieces to be coupled in the rotational direction thereof. In particular, the distance between the pair of the rotation prevention pieces may correspond to the width of the stopper portion.

According to the present disclosure as described above, the base portion of the clip may support the upper surface of the connector housing, and the elastic piece may support the lower surface of the injector cup to elastically support the injector against the fuel injection load, thus attenuating the fuel injection load.

In addition, since the internal stress generated during elastic compression of the clip is uniformly dispersed by the first elastic piece and the second elastic piece, the durability of the clip against repetitive fatigue may be improved.

Further, the movement of the clip may be constrained in the rotational direction by inserting and engaging the engaging piece with the engaging portion of the injector cup, and the both side tightly contacting portions of the clip tightly abutting the both side surfaces of the connector housing, thereby restricting the rotation of the connector housing to prevent the rotation of the injector.

Moreover, the stopper portion formed on the upper surface of the connector housing may be interposed between the rotation prevention pieces of the base portion of the clip to be engaged in the rotation direction thereof, thereby further reliably preventing the rotation of the injector. Accordingly, the injector may maintain a stable installation state in the vertical direction and the rotational direction, such that the fuel may be injected to an accurate angle and location, thereby enhancing the combustion performance.

Meanwhile, the engaging piece of the clip may be press-fitted into the engaging hole of the engaging portion of the injector cup and prevent the clip from separating downward, and the stopper protrusion of the upper body of the injector may be engaged on the upper surface of the base portion, such that in the state that the upper body of the injector is inserted into the injector cup and the clip is fastened, the injector may not be separated from the fuel rail. Accordingly, the fuel rail and the injector may be mounted more easily during the engine assembly, thereby enhancing the assemblability.

Furthermore, since the base portion of the clip may be formed in the straight-line shape that the width of both side surfaces thereof becomes narrower toward the front side thereof, the amount and the cost of material used may be reduced, and the weight of the clip may also be reduced.

DETAILED DESCRIPTION

Figure 1:
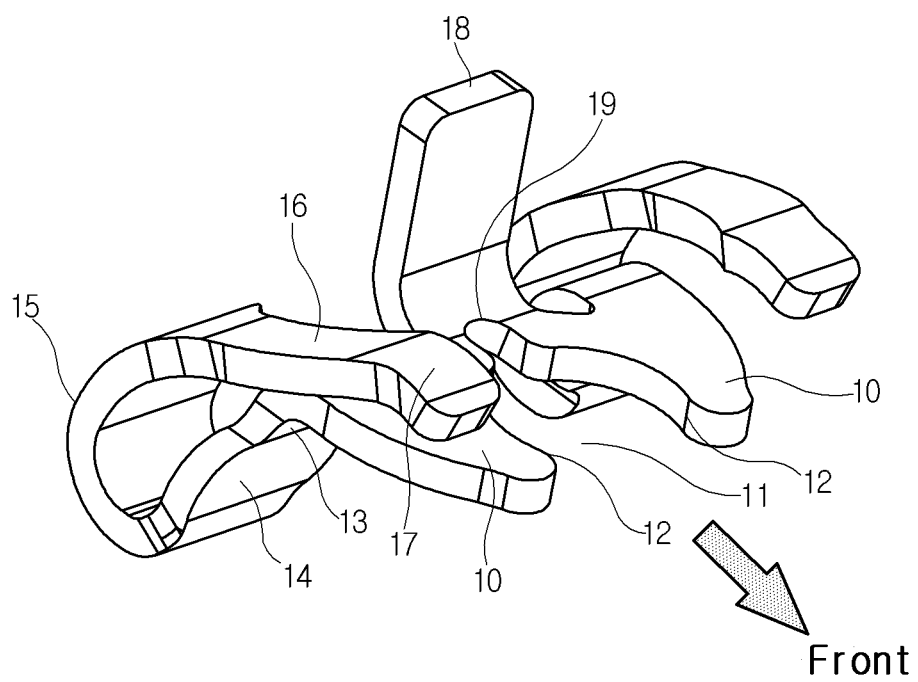
FIG. 1 is a perspective view of a clip for an injector in accordance with the present disclosure.

Various modifications and various forms may be made in the present disclosure, so that specific exemplary embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure. The thickness of the lines and the size of the elements illustrated in the attached drawings can be exaggerated for clarity and convenience of explanation.

In some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items. The same reference numerals refer to the same components throughout the disclosure.

In addition, the following terms are defined in consideration of the functions of the present disclosure, and this can be changed according to the intention of the user and the operator or the cases. Accordingly, the definitions of these terms should be made based on the contents throughout this specification.

Hereinafter, the preferred embodiments in accordance with the present disclosure will be described in detail with reference to the accompanying drawings.

Figure 2:
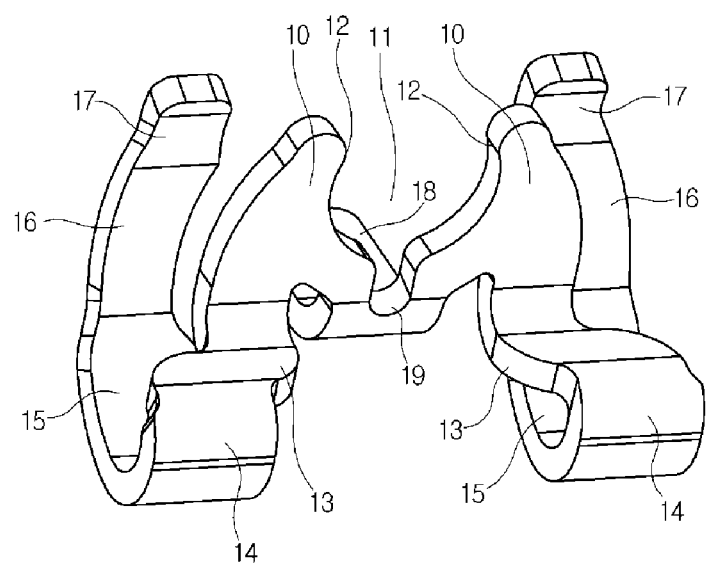
FIG. 2 is a lower surface perspective view of the clip for the injector in accordance with the present disclosure.
Figure 3:
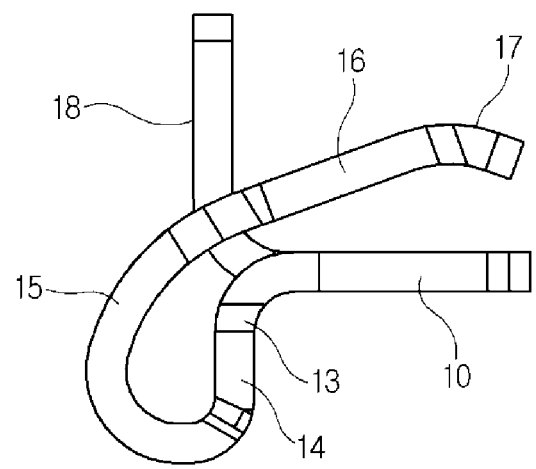
FIG. 3 is a side view of the clip for the injector in accordance with the present disclosure.

FIGS. 1 to 3 are a perspective view, a lower surface perspective view, and a side view of a clip for an injector in accordance with the present disclosure. As illustrated in FIGS. 1 to 3, a clip for an injector in accordance with the present disclosure may include a base portion 10, a first elastic portion 14 elongated from both side portions of the rear end of the base portion 10 and bending downward, a second elastic portion 15 elongated from the first elastic portion 14 and smoothly bending upward, and an elastic piece 16 elongated from the second elastic portion 15 and inclined upward and toward the front side (the protruded direction of the base portion 10).

The base portion 10 may be approximately a semicircular flat plate member, and may be formed with an injector receiving portion 11 having a circular shape in which some sections are open in the forward direction thereof. Both side surfaces of the inlet of the injector receiving portion 11 may be formed with a protrusion portion 12 toward the inside (i.e., the direction that faces each other) of the injector receiving portion 11.

The first elastic portion 14 may be elongated after a downward bending of the rear end of the base portion 10, the second elastic portion 15 may be the portion elongated after an upward, roundly bending of the lower end of the first elastic portion 14, the first elastic portion 14 and the second elastic portion 15 may be formed approximately in the U shape or the ring shape, and the elasticity may be provided to the vertical movement of the elastic piece 16 due to the bending shape. That is, the elasticity may be provided to the elastic piece 16 by the smoothly bent engaging shapes of the first elastic portion 14 and the second elastic portion 15.

The elastic piece 16 may be the portion elongated by inclining the upper end of the second elastic portion 15 toward the front surface and the upward direction of the clip, and the upper end surface thereof may support the lower surface of an injector cup 40 (referring to FIGS. 4 to 6) provided in the fuel rail.

A tightly contacting portion 13 may be interposed between the rear end of the base portion 10 and the upper end of the first elastic portion 14. The tightly contacting portion 13 may be protruded toward the inside of the clip farther than the first elastic portion 14 (referring to FIG. 2).

The upper end of the elastic piece 16 may be smoothly bent downward again to form an inclined portion 17.

The rear end center of the base portion 10 may be formed with an engaging piece 18 elongated by being bent upward. The engaging piece 18 may be molded to be elongated to a height that is higher than the upper end of both side elastic pieces 16.

A separation groove 19 having a concave shape may be formed on the inner circumferential center of the injector receiving portion 11 (coinciding with the width-directional center of the engaging piece 18) toward the engaging piece 18 side, that is, the rear thereof.

The separation groove 19 may further separate both side portions of the base portion 10 that are separated by the injector receiving portion 11 to make elastic deformation that the both side portions of the base portion 10 may be narrowed or widened.

Figure 4:
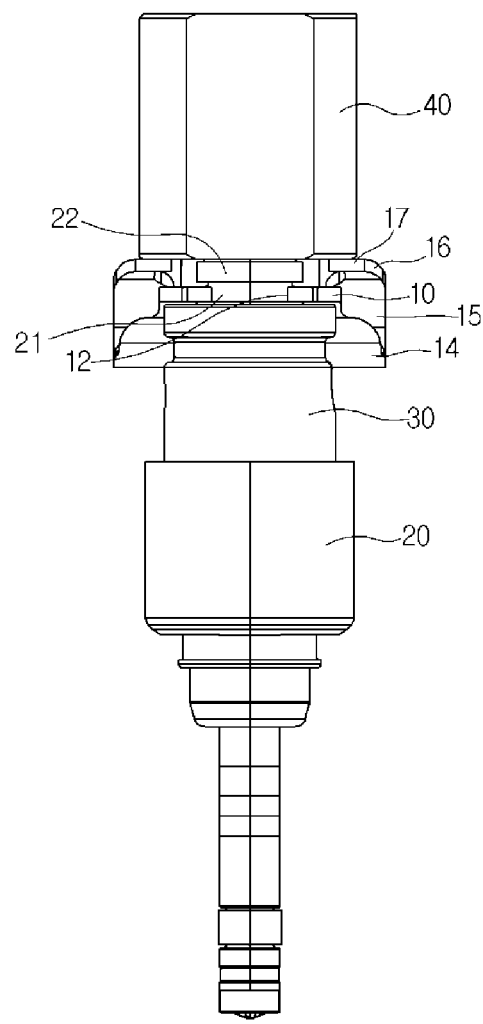
FIG. 4 is a front view of the installation state of the clip for the injector in accordance with the present disclosure.
Figure 5:
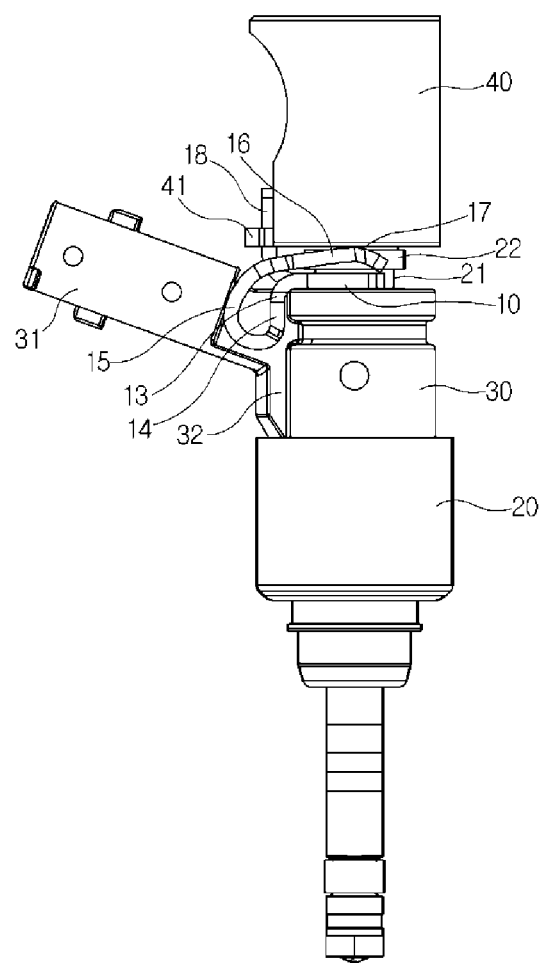
FIG. 5 is a side view of the installation state of the clip for the injector in accordance with the present disclosure.
Figure 6:
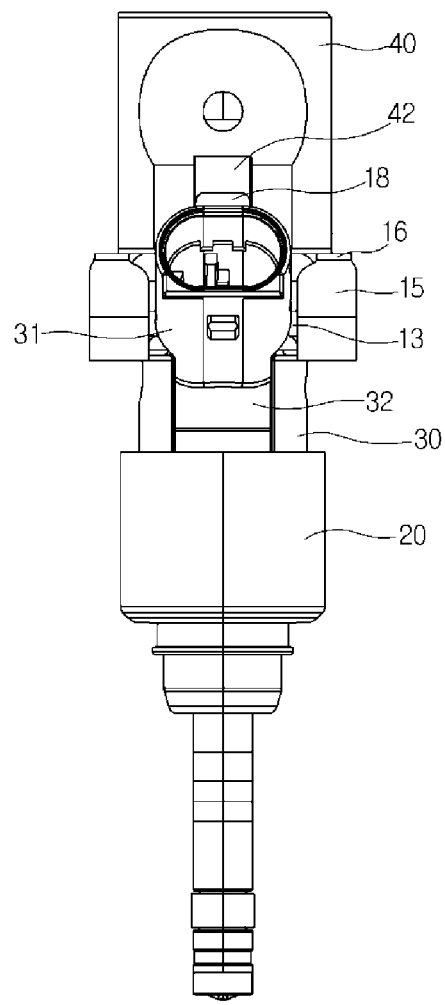
FIG. 6 is a rear view of the installation state of the clip for the injector in accordance with the present disclosure.

The installation structure and effects of the clip for the injector in accordance with the present disclosure will be described with reference to FIGS. 4 to 6. The clip for the injector in accordance with the present disclosure may be disposed between the upper surface of a connector housing 30 of an injector 20 and the lower surface of the injector cup 40 of the fuel rail.

An upper body 21 of the injector 20 may be inserted into the inside of the injector receiving portion 11 of the base portion 10. The upper body 21 may be formed in a cylindrical shape. In particular, the upper body 21 of the injector 20 may be inserted into the inside of the injector receiving portion 11 while both side portions of the base portion 10 are widened due to the separation groove 19 formed on the inner circumferential surface of the injector receiving portion 11 more easily.

When the upper body 21 is inserted into the inside of the injector receiving portion 11, the both side portions of the base portion 10 may surround the outer circumferential surface of the upper body 21, and the upper body 21 of the injector 20 may be engaged on (e.g., retained between) the protrusion portion 12 formed on both sides of the inlet of the injector receiving portion 11, thus preventing it from separating from the injector receiving portion 11.

As described above, when the base portion 10 is engaged in the upper body 21 of the injector 20, the lower surface of the base portion 10 may abut the upper surface of the connector housing 30.

The upper body 21 may be surrounded by the connector housing 30 provided in the injector 20. A connector 31 for connecting the injector 20 with an engine control unit for controlling the fuel injection timing and amount may be formed to be protruded at one side of the connector housing 30. An engaging portion 32 between the connector housing 30 and the connector 31 may have both side surfaces formed in a plane shape.

In the clip engaged state as described above, the both side tightly contacting portions 13 of the clip may tightly abut the both side engaging portions 32 of the connector housing 30. Accordingly, the connector housing 30 may be prevented from rotating with respect to the clip, and thereby the injector 20 that is integral with the connector housing 30 may also be prevented from rotating with respect to the clip.

The first elastic portion 14 and the second elastic portion 15 of both sides of the clip may be disposed to be spaced at a predetermined interval apart from both side surfaces of the engaging portion 32.

The both side elastic pieces 16 may be inserted into the lower portion of the injector cup 40 while pressed downward, and then widened upward again by the elastic restoring force, thus tightly contacting the upper end portion of the elastic piece 16 to the lower surface of the injector cup 40. At this time, the elastic piece 16 may be easily inserted into the lower portion space of the injector cup 40 due to the inclined portion 17 of the elastic piece 16.

As described above, the elastic piece 16 may push the lower surface of the injector cup 40, thus tightly contacting the lower surface of the base portion 10 to the upper surface of the connector housing 30 by the reaction force against it.

In particular, since the elastic reaction force generated on the engaging portion of the first elastic portion 14 and the second elastic portion 15 is applied on the lower surface of the injector cup 40 and the upper surface of the connector housing 30 through the elastic piece 16 and the base portion 10, the connector housing 30 and the injector 20 that is integral therewith may be elastically supported downward with respect to the injector cup 40 that is fixed to the fuel rail in the vertical direction.

Accordingly, when the fuel injection load is applied in the upward of the injector 20 upon fuel injection, the clip may attenuate the upward load due to the fuel injection reaction force while elastically supporting the injector 20 downward. At this time, the stress produced on the engaging portion of the first elastic portion 14 and the second elastic portion 15 by the fuel injection load may be evenly dispersed by the first elastic portion 14 and the second elastic portion 15 of the both sides, such that the stress may be relieved to enhance the durability of the clip against fatigue due to the continuous compression and the restoration.

Meanwhile, an engaging portion 41 may be formed to be protruded on the back surface of the injector cup 40, and an engaging hole may be formed to vertically penetrate the engaging portion 41.

In the above-described clip installation state, the engaging piece 18 of the clip may be inserted into the engaging hole of the engaging portion 41 to restrict the movement in the rotation direction thereof. In addition, the engaging piece 18 may be press-fitted into the engaging hole of the engaging portion 41 to prevent it from separating downward.

Since the injector cup 40 may be integrally fixed to the fuel rail and thus the movement in the rotation direction thereof may not be possible, the injector 20 in which the rotation with respect to the clip is restrained by the tightly contacting portion 13 may not be rotated with respect to the injector cup 40 as well. As such, the injector 20 may acquire the state that the rotation with respect to the injector cup 40 is not possible due to the clip.

In addition, the back surface of the injector cup 40 may be formed with a seating groove 42 having the same width as the engaging piece 18 in the vertical direction. The front surface portion of the engaging piece 18 may be inserted and seated into the seating groove 42 at a predetermined depth and both side surfaces of the seating groove 42 may be engaged with both side surfaces of the engaging piece 18, thereby preventing the rotation of the clip.

At this time, the engaging hole of the seating groove 42 and the engaging portion 41 may be communicated with each other to make one space. The space may become the engaging hole into which the engaging piece 18 may be inserted from the downward thereof. As described above, the engaging piece 18 may be press-fitted into the engaging hole of the engaging portion 41 of the injector cup 40 and may not be separated from the engaging hole.

In addition, a stopper protrusion 22 having a ring shape may be radially protruded outward along the circumferences on the outer circumferential surface of the upper body 21 of the injector 20. When the upper body 21 is inserted into the injector receiving portion 11 of the clip to tightly contact the lower surface of the base portion 10 to the upper surface of the connector housing 30, the upper surface of the base portion 10 may be disposed on the lower portion of the stopper protrusion 22. In particular, the base portion 10 may be interposed between the upper surface of the connector housing 30 and the stopper protrusion 22 of the injector 20.

Accordingly, when fitting the upper body 21 of the injector 20 into the injector cup 40 of the fuel rail and fastening the clip, the clip may not be separated from the injector cup 40 by the engaging force of the engaging piece 18, and the stopper protrusion 22 may be engaged by the base portion 10 of the clip for the injector 20, thus preventing it from separating downward from the clip. Therefore, when assembling the fuel rail and the injector to the engine with a plurality of injectors assembled to the fuel rail, since the injector is not separated from the fuel rail, the fuel rail and the injector may be easily mounted on the engine, thus enhancing the assemblability.

Figure 7:
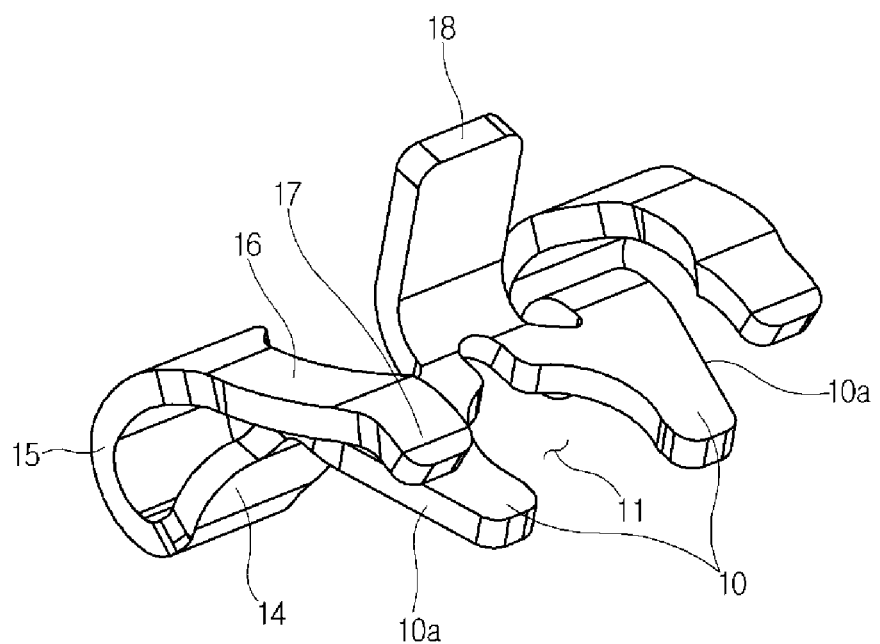
FIG. 7 is a perspective view of another exemplary embodiment of the clip for the injector in accordance with the present disclosure.

FIG. 7 is a perspective view illustrating another exemplary embodiment of the clip for the injector in accordance with the present disclosure, and the shapes of both outside surfaces 10a of the base portion 10 may be different from those of the exemplary embodiment illustrated in FIG. 1.

In the exemplary embodiment illustrated in FIG. 1, both outside surfaces of the base portion 10 may be formed as arc-like curves so that the base portion 10 may be approximately the semicircular shape (including a portion where the injector receiving portion 11 is formed), while in the exemplary embodiment illustrated in FIG. 7, the shapes of both outside surfaces 10a of the base portion 10 may be formed in the straight-line (e.g., linear) shape. That is, both outside surfaces 10a of the base portion 10 from the rear end of the base portion 10 to the front end thereof may be the straight-line shape in which the width (the distance between both outside surfaces 10a) becomes narrower toward the front of the clip. Accordingly, the base portion 10 may have a trapezoidal shape. The both outside surfaces 10a may correspond to the oblique side of the trapezoidal shape.

The clip thus formed may have substantively similar operations and effects as the clip of FIG. 1, and may have an additional effect of reducing the material cost and the clip weight by reducing the amount of the material used. In particular, when the outside surface 10a is formed in the straight-line shape rather than in the arc-like curve shape, the material corresponding to the area of the portion between the straight line and the curve may be saved, thereby reducing the material cost for manufacturing the clip and also reducing the weight of the clip.

Figure 8:
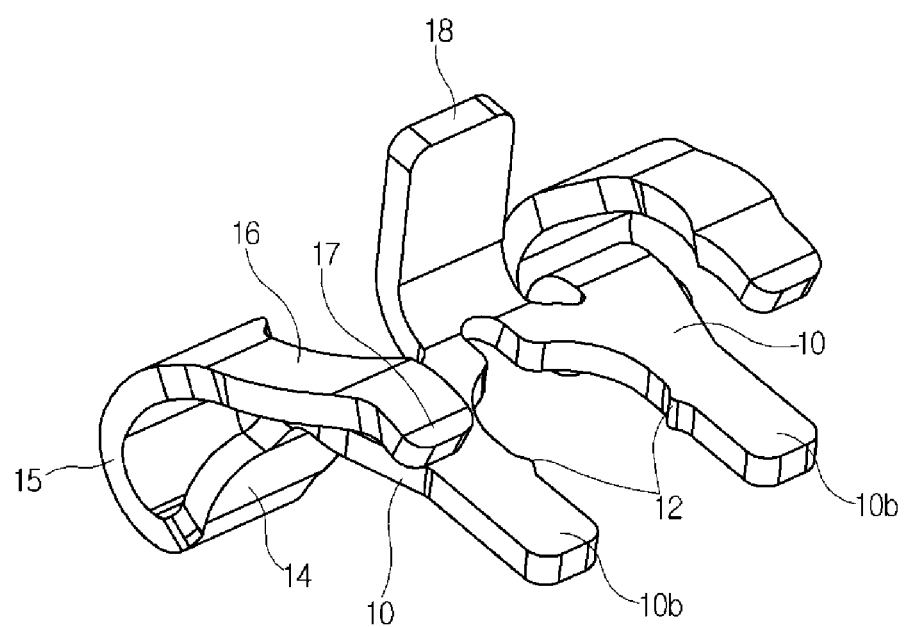
FIG. 8 is a perspective view of further another exemplary embodiment of the clip for the injector in accordance with the present disclosure.

FIG. 8 is a perspective view of further another exemplary embodiment of the clip for the injector in accordance with the present disclosure. The exemplary embodiment illustrated in FIG. 8 may be characterized in that, compared with the exemplary embodiment illustrated in FIG. 1, the front end portions of both side portions of the base portion 10 may be protruded and extended in a rectangular plate shape to form a rotation prevention piece 10b. The inside surfaces (the surfaces that face each other) of the both side rotation prevention pieces 10b may be formed in the straight-line shape parallel to each other.

A plate shaped stopper portion 33 having the thickness similar to the thickness of the rotation prevention piece 10b may be formed to protrude upward on the upper surface of the connector housing 30 that corresponds to the rotation prevention piece 10b. The stopper portion 33 may be formed on the opposite side of the connector 31 with respect to the upper body 21. In addition, both side surfaces of the stopper portion 33 may be formed in the straight-line shape (e.g., flat surface) in the same direction as the inside surface of the rotation prevention piece 10b when the clip has been assembled to the injector 20. Further, the width (i.e., the distance between the both side surfaces) of the stopper portion 33 may be the same as the distance between the inside surfaces of the rotation prevention pieces 10b.

Figure 9:
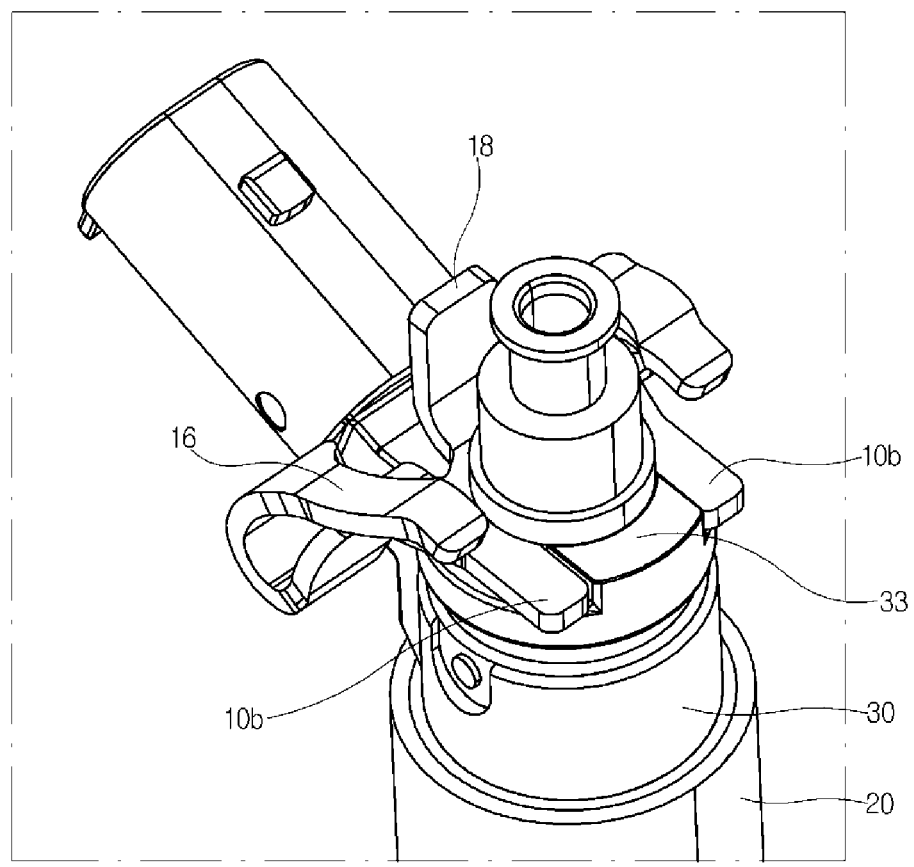
FIG. 9 is a perspective view of the installation state of the clip for the injector illustrated in FIG. 8.

Accordingly, as illustrated in FIG. 9, when the clip has been installed, the stopper portion 33 may be inserted between the rotation prevention pieces 10b, and at this time, the inside surfaces of the both side rotation prevention pieces 10b may be tightly contacted and engaged to the both side surfaces of the stopper portion 33, respectively, thus preventing the injector 20 from rotating with respect to the clip.

As described above, since the clip may be engaged to the injector cup 40 affixed by the engaging piece 18 to restrict the movement in the rotational direction thereof, the rotation of the injector 20 may be also restrained by the engagement of the rotation prevention piece 10b and the stopper portion 33, thus preventing the rotation of the injector 20. Accordingly, the rotation of the injector 20 may be reliably prevented by the engagement of the tightly contacting portion 13 and the engaging portion 32 and additionally by the engagement of the rotation prevention piece 10b and the stopper portion 33.

Although the present disclosure has been described in connection with the exemplary embodiments illustrated in the drawings, these are merely examples and it will be understood by those skilled in the art that various modifications and equivalent embodiments are possible. Accordingly, the technical scope of the present disclosure should be defined by the following claims.

What is claimed is:
1. A clip for an injector, comprising:
a base portion configured to tightly abut an upper surface of a connector housing of an injector to elastically support the upper surface of the connector housing of the injector;

a pair of first elastic portions elongated from both side parts of a rear end of the base portion and bending downward;

a pair of second elastic portions formed at both of the first elastic portions and bending upward; and a pair of elastic pieces elongated from both of the second elastic portions and inclined upward toward a front direction, which is configured to tightly abut a lower surface of an injector cup of a fuel rail to elastically support the lower surface of the injector cup of the fuel rail, wherein the base portion includes an injector receiving portion into which an upper body of the injector is configured to be inserted, wherein a separation groove in a concavely recessed shape, is formed at a center of an inner circumferential surface of the injector receiving portion, the separation groove being disposed on a same plane as the injector receiving portion, so as to permit elastic deformation of the base portion in a radial direction, and wherein the injector receiving portion and the separation groove communicate with each other, and an opening of the injector receiving portion is wider than that of the separation groove.

2. The clip for the injector of claim 1,
wherein a protrusion portion is formed at both sides of the inner circumferential surface of the injector receiving portion proximate to an inlet thereof for preventing a separation of the upper body of the injector.

3. The clip for the injector of claim 1,
wherein an upper surface of the base portion is configured to support a stopper protrusion formed on an outer circumference of the upper body of the injector.

4. The clip for the injector of claim 1,
wherein a tightly contacting portion, which is formed to be protruded closer toward the connector housing of the injector than the first elastic portions and configured to abut side surfaces of the connector housing, is interposed between the rear end of the base portion and an upper end of the first elastic portions, and wherein the tightly contacting portion is bent at least two times to correspond to both sides of the connector housing.

5. The clip for the injector of claim 1,
wherein an engaging piece is formed to be protruded upward from the rear end of the base portion and configured to be inserted into an engaging hole of an engaging portion formed on the injector cup of the fuel rail, and wherein a front surface of the engaging piece is configured to be inserted into a seating groove formed on a rear surface of the injector cup to be coupled in a rotational direction thereof.

6. The clip for the injector of claim 1,
wherein a pair of rotation prevention pieces are formed to extend forward at front ends portions of the base portion, respectively, and configured to receive a stopper portion formed on the upper surface of the connector housing of the injector between the pair of the rotation prevention pieces to be coupled in a rotational direction thereof, and wherein the first elastic portions and the second elastic portions impart elasticity to vertical motion of the elastic pieces by the bent shape.

7. The clip for the injector of claim 6,
wherein a distance between the pair of the rotation prevention pieces corresponds to a width of the stopper portion.

* * * * *